under 35 U.S.C. 154(b) by 0 days.

United States Patent
Hyun et al.

(10) Patent No.: US 9,008,160 B2
(45) Date of Patent: Apr. 14, 2015

(54) TRANSMITTING/RECEIVING CIRCUIT AND TRANSMITTING/RECEIVING SYSTEM INCLUDING THE SAME

(71) Applicant: SK Hynix Inc., Gyeonggi-do (KR)

(72) Inventors: Sang-Ah Hyun, Gyeonggi-do (KR); Hyun-Woo Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/106,805

(22) Filed: Dec. 15, 2013

(65) Prior Publication Data
US 2015/0043622 A1  Feb. 12, 2015

(30) Foreign Application Priority Data
Aug. 9, 2013  (KR) .................... 10-2013-0094522

(51) Int. Cl.
  *H04B 1/38*  (2006.01)
  *H04L 29/08*  (2006.01)
  *H04K 1/00*  (2006.01)

(52) U.S. Cl.
  CPC .............. *H04L 29/0854* (2013.01); *H04B 1/38* (2013.01); *H04K 1/00* (2013.01)

(58) Field of Classification Search
  CPC .............. H04B 1/38; H04B 1/48; H04B 3/50; H04B 3/00; H04L 29/0854; H05K 1/00; H03K 3/26; H03K 3/45; H03K 3/195

USPC .................. 330/55, 252, 255, 258, 307, 304; 375/219, 259–260, 285, 288; 327/112, 327/280, 355

See application file for complete search history.

(56) References Cited

U.S. PATENT DOCUMENTS

| 7,277,684 | B2* | 10/2007 | Kushima et al. ........... 455/232.1 |
|---|---|---|---|
| 7,619,448 | B2* | 11/2009 | Wu et al. ........................ 327/108 |
| 7,813,495 | B1* | 10/2010 | Ziazadeh et al. .............. 379/398 |
| 7,889,752 | B2* | 2/2011 | Sutardja et al. ............... 370/420 |
| 8,502,584 | B1* | 8/2013 | Dong et al. .................... 327/206 |
| 2004/0120405 | A1* | 6/2004 | Jaussi et al. ................... 375/257 |
| 2012/0177087 | A1* | 7/2012 | Konishi ......................... 375/219 |
| 2013/0241656 | A1* | 9/2013 | Tajima et al. ................. 330/295 |

FOREIGN PATENT DOCUMENTS

KR   1020070116666   12/2007

* cited by examiner

*Primary Examiner* — Jean B Corrielus
(74) *Attorney, Agent, or Firm* — IP & T Group LLP

(57) ABSTRACT

A transmitting/receiving circuit includes a transmitter suitable for transmitting a transmission signal to a channel, a receiver suitable for receiving a signal of the channel, a replica channel configured by replicating the channel, a replica transmitter suitable for transmitting the transmission signal to the replica channel, a replica receiver suitable for receiving a signal of the replica channel, and a restoring unit suitable for synthesizing the signal of the channel, which is received by the receiver, and the signal the replica channel, which is received by the replica receiver, and restoring a reception signal from the signal of the channel.

20 Claims, 4 Drawing Sheets

TRANSMITTING/RECEIVING CIRCUIT AND TRANSMITTING/RECEIVING SYSTEM INCLUDING THE SAME

CROSS-REFERENCE TO RELATED APPLICATIONS

The present application claims priority of Korean Patent Application No. 10-2013-0094522, filed on Aug. 9, 2013, which is incorporated herein by reference in its entirety.

BACKGROUND

1. Field

Exemplary embodiments of the present invention relate to a technique for transmitting/receiving data.

2. Description of the Related Art

A variety of integrated circuit chips operate while exchanging signals with the other chips. For example, memory chips such as DRAM and NAND Flash exchange data with a memory controller, and a CPU also exchanges data with various chips on a motherboard.

Conventionally, signal transmission or reception between integrated circuit chips has been generally performed in one direction. For example, a clock is transmitted from an A chip to a B chip or from the B chip to the A chip through a clock channel connected between the A chip and the chip B. The clock is not transmitted in both directions through the same channel. Furthermore, through a data channel connected between a memory chip and a memory controller, data is transmitted from the memory chip to the memory controller during a read operation, and transmitted from the memory controller to the memory chip during a write operation. However, data may not be transmitted in both directions through the same channel at the same time.

SUMMARY

Exemplary embodiments are directed to a transmitting/receiving circuit capable of transmitting signals in both directions through one channel at the same time and a transmitting/receiving system including the same.

In an embodiment, a transmitting/receiving circuit includes a transmitter suitable for transmitting a transmission signal to a channel, a receiver suitable for receiving a signal of the channel, a replica channel configured by replicating the channel, a replica transmitter suitable for transmitting the transmission signal to the replica channel, a replica receiver suitable for receiving a signal of the replica channel, and a restoring unit suitable for synthesizing the signal of the channel, which is received by the receiver, and the signal of the replica channel, which is received by the replica receiver, and restoring a reception signal from the signal of the channel.

In another embodiment, a transmitting/receiving system includes a channel, a first transmitting/receiving circuit suitable for transmitting a first transmission signal through the channel, and a second transmitting/receiving circuit suitable for transmitting a second transmission signal through channel, wherein the first and second transmitting/receiving circuits each comprises a replica channel configured by replicating the channel, and a restoring unit suitable for synthesizing a first signal transmitted through the replica channel and a second signal transmitted through the channel and restoring the first transmission signal or the second transmission signal from the second signal.

In further embodiment, a transmitting/receiving system includes a first integrated circuit chip comprising one or more first transmitting/receiving circuits, and a second integrated circuit chip comprising one or more second transmitting/receiving circuits, wherein the first transmitting/receiving circuits communicate with the second transmitting/receiving circuits through respective channels, and wherein the first transmitting/receiving circuit is suitable for transmitting a first clock through the channel and restoring first data by subtracting the first clock from a first signal transmitted through the channel, and the second transmitting/receiving circuit is suitable for transmitting the first data synchronized with the first clock through the channel and restoring the first clock by subtracting the first data from the first signal transmitted through the channel.

DETAILED DESCRIPTION

Figure 1:
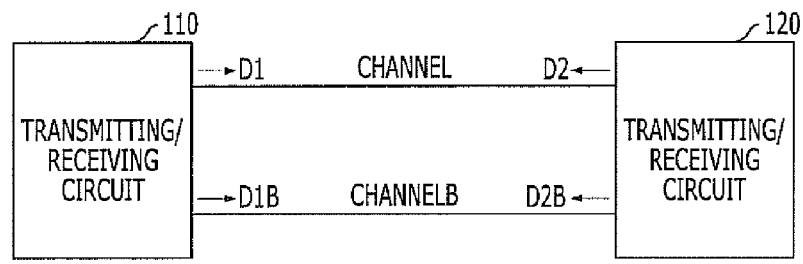
FIG. 1 is a configuration diagram of a transmitting/receiving system in accordance with an embodiment of the present invention.

Exemplary embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a configuration diagram of a transmitting/receiving system in accordance with an embodiment of the present invention.

Referring to FIG. 1, the transmitting/receiving system includes a first transmitting/receiving circuit 110, a second transmitting/receiving circuit 120, and a channel CHANNEL and CHANNELB. The first transmitting/receiving circuit 110 and the second transmitting/receiving circuit 120 may be provided in the same chip or device or provided in separate chips or devices, respectively. The channel CHANNEL and CHANNELB may include two lines to transmit differential signals.

The first transmitting/receiving circuit 110 is configured to transmit a signal D1 and D1B to the second transmitting/receiving circuit 120 through the channel CHANNEL and CHANNELB, and the second transmitting/receiving circuit 120 is configured to transmit a signal D2 and D2B to the first transmitting/receiving circuit 110 through the channel CHANNEL and CHANNELB. The signal transmission of the first transmitting/receiving circuit 110 and the signal transmission of the second transmitting/receiving circuit 120 through the channel CHANNEL and CHANNELB may be performed at the same time. That is, the signals D1 and D1B and D2 and D2B may be transmitted through the channel CHANNEL and CHANNELB in both ways.

Hereafter, the configuration of the transmitting/receiving circuits 110 and 120 capable of transmitting the signals D1 and D15 and D2 and D2B through the channel CHANNEL and CHANNELB in both ways will be described.

Figure 2:
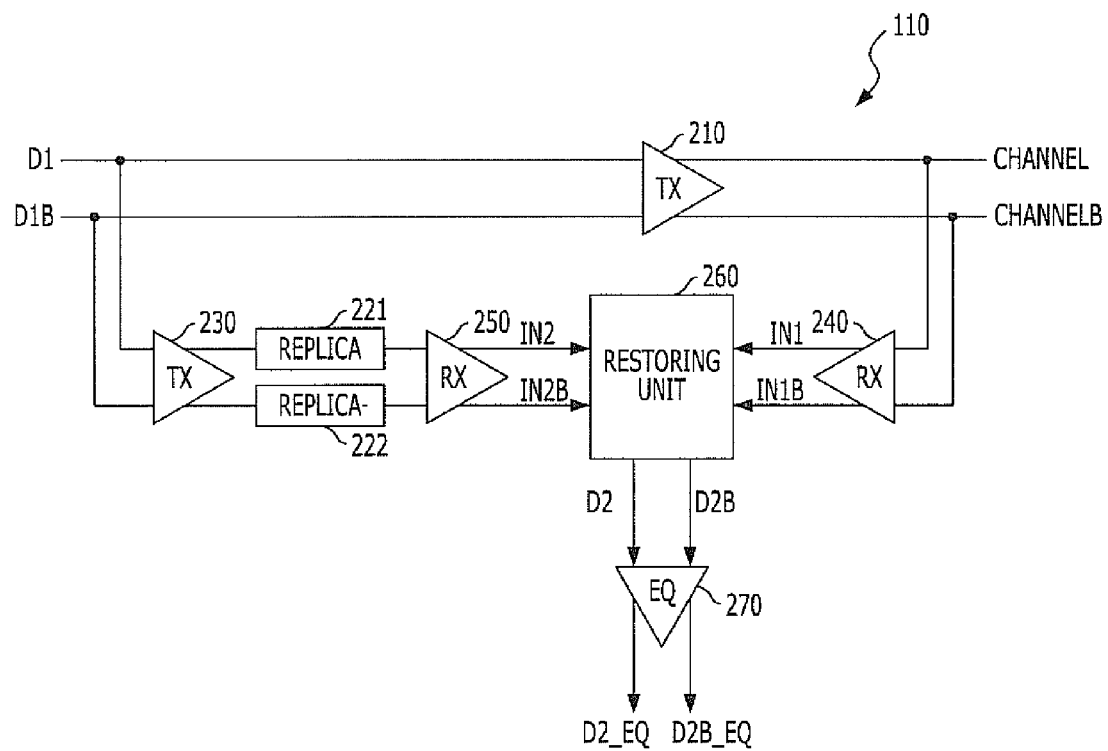
FIG. 2 is a configuration diagram of a first transmitting/receiving circuit of FIG. 1.

FIG. 2 is a configuration diagram of the first transmitting/receiving circuit 110 of FIG. 1.

Referring to FIG. 2, the first transmitting/receiving circuit 110 includes a transmitter 210, a replica channel 221 and 222, a replica transmitter 230, a receiver 240, a replica receiver 250, a restoring unit 260, and an equalizing unit 270.

The transmitter 210 may transmit the signal D1 and D1B, which is a target signal to be transmitted from the first transmitting/receiving circuit 110 to the second transmitting/receiving circuit 120, to the channel CHANNEL and CHANNELS.

The replica channel 221 and 222 to have the same properties as the channel CHANNEL and CHANNELS by replicating the channel CHANNEL and CHANNELS.

The replica transmitter 230 may transmit the signal D1 and D1B to the replica channel 221 and 222. As the replica transmitter 230 is configured in the same manner as the transmitter 210, the precision of the restoring unit 260 increases. Thus, the replica transmitter 230 may be configured in substantially the same manner as the transmitter 210, even if the replica transmitter 230 is not perfectly identical to the transmitter 210.

The receiver 240 may receive the signal loaded in the channel CHANNEL and CHANNELB. Since both of the signal D1 and D1B transmitted to the channel from the first transmitting/receiving circuit 110 and the signal D2 and D2B transmitted to the channel from the second transmitting/receiving circuit 120 are loaded in the channel CHANNEL and CHANNELB, the receiver 240 receives a combined signal (IN1=D1+D2 and IN1B=D1B+D2B) of the signal D1 and D1B and the signal D2 and D2B.

The replica receiver 250 may receive the signal loaded in the replica channel 221 and 222. As the replica receiver 250 is configured in the same manner the receiver 240, the precision of the restoring unit 260 increases. Thus, the replica receiver 250 may be configured in the substantially the same manner, even if the replica receiver 250 is not perfectly identical to the receiver 240. The signal IN2 and IN2B outputted by the replica receiver 250 is equal to the signal D1 and D1B of the signal IN1 and IN1B outputted by the receiver 240. This is because the signal D1 and D1B of the signal IN1 and IN1B has passed through the transmitter 210, the channel CHANNEL and CHANNELB, and the receiver 240, and the signal IN2 and IN2B has passed through the replica transmitter 230, the replica channel 221 and 222, the replica receiver 250. As described above, it is important to design the replica receiver 250 in substantially the same manner as the receiver 240. Thus, when a component for improving the receiving ability of the receiver 240 (for example, a component for optimally adjusting a gain of the receiver) is added to the receiver 240, the same component may be added to the replica receiver 250.

The restoring unit 260 may synthesize the signal IN1 and IN1B received through the receiver 240 and the signal IN2 and IN2B received through the replica receiver 250 and restore the signal D2 and D2B transmitted from the second transmitting/receiving circuit 120. Specifically, the restoring unit 260 may restore the signal D2 and D2B transmitted by the second transmitting/receiving circuit 120 by subtracting the signal IN2 and IN2B from the signal IN1 and IN1B. That is, the first transmitting/receiving circuit 110 subtracts the signal, which is transmitted and recognized by the first transmitting/receiving circuit 110, from the signal loaded on the channel, thereby restoring the signal transmitted by the second transmitting/receiving circuit 120.

The equalizing unit 270 may equalize the signal D2 and D2B restored by the restoring unit 260. The equalizing unit 270 serves to equalize the restored signal D2 and D2B so that the restored signal D2 and D2B has a constant response characteristic (gain) in a wide frequency region. Thus, the equalizing unit 270 may be omitted depending on changes in circuit design.

The first transmitting/receiving circuit 110 illustrated in FIG. 2 may receive the signal on the channel CHANNEL and CHANNELB, subtract the signal D1 and D1B transmitted by the first transmitting/receiving circuit 110 from the received signal IN1 and IN1B, and restore the signal D2 and D2B transmitted by the second transmitting/receiving circuit 120. Furthermore, since the signal IN2 and IN2B used for the subtraction passes through the same path 230, 221, 222 and 250 as the signal IN1 and IN1B received through the receiver 240, the first transmitting/receiving circuit 110 may precisely restore the signal D2 and D2B transmitted by the second transmitting/receiving circuit 120.

FIG. 2 illustrates the internal configuration of the first transmitting/receiving circuit 110. The second transmitting/receiving circuit 120 may be configured in the same manner as illustrated in FIG. 2.

Figure 3:
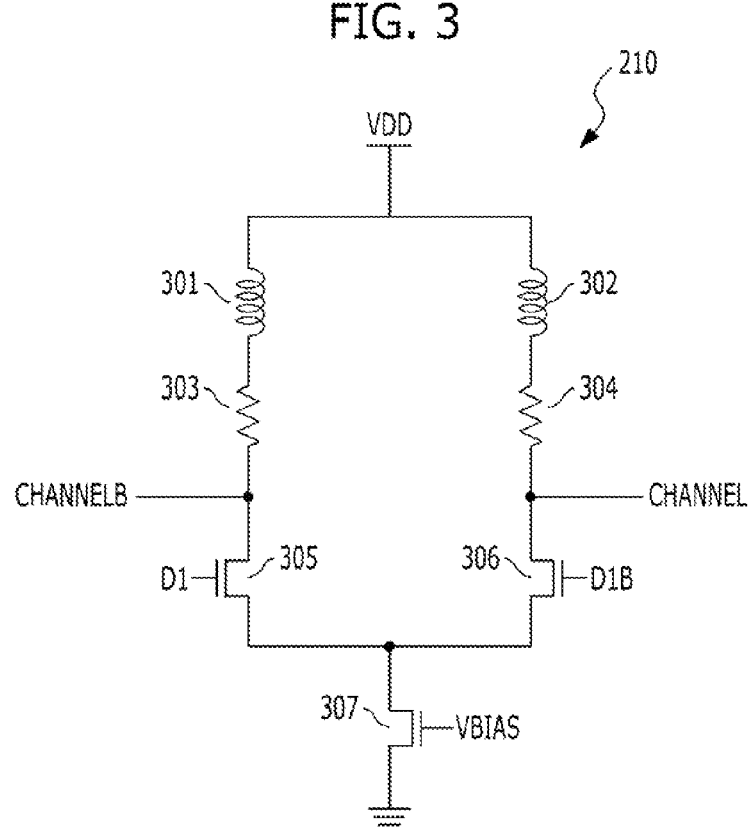
FIG. 3 is a configuration diagram of a transmitter of FIG. 2.

FIG. 3 is a configuration diagram of the transmitter 210 of FIG. 2.

Referring to FIG. 3, the transmitter 210 may include inductors 301 and 302, resistors 303 and 304, and transistors 305, 306 and 307.

The transmitter 210 may amplify a voltage level difference between the input signals D1 and D1B and transmit the amplified signals to the channels CHANNEL and CHANNELB. When the signal D1 has any higher voltage level than the signal D1B, the transmitter 210 may transmit a high-level signal to the channel CHANNEL and a low-level signal to the channel CHANNELB. When the signal D1B has any higher voltage level than the signal D1, the transmitter 210 may transmit a high-level signal to the channel CHANNELS and a low-level signal to the channel CHANNEL. A bias voltage VBIAS inputted to the transistor 307 may control the constant amount of current to flow in the transmitter 210.

The transmitter 210 illustrated in FIG. 3 may have a differential amplifier structure, but may be modified in various manners. The replica transmitter 230 may be configured in the same manner as the receiver 210. Furthermore, since the receiver 240 and the replica receiver 250 are configured to amplify an input signal and generate an output signal, the receiver 240 and the replica receiver 250 may be configured in a similar manner to FIG. 3.

Figure 4:
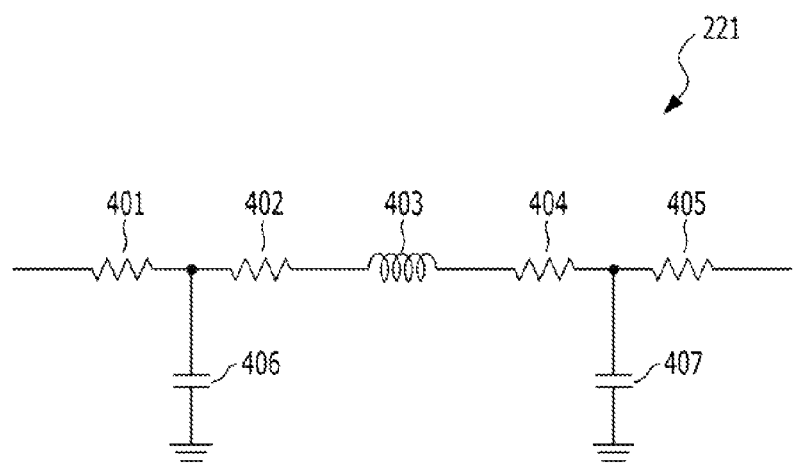
FIG. 4 is a configuration diagram of a replica channel of FIG. 2.

FIG. 4 is a configuration diagram of the replica channel 221 of FIG. 2.

Referring to FIG. 4, the replica channel 221 may include resistors 401, 402, 404 and 405, an inductor 403, and capacitors 406 and 407. By properly adjusting R, L, and C values, the replica channel 221 may be configured to have the same properties as the channel CHANNEL. The replica channel 222 may be configured in the same manner as illustrated in FIG. 4.

Figure 5:
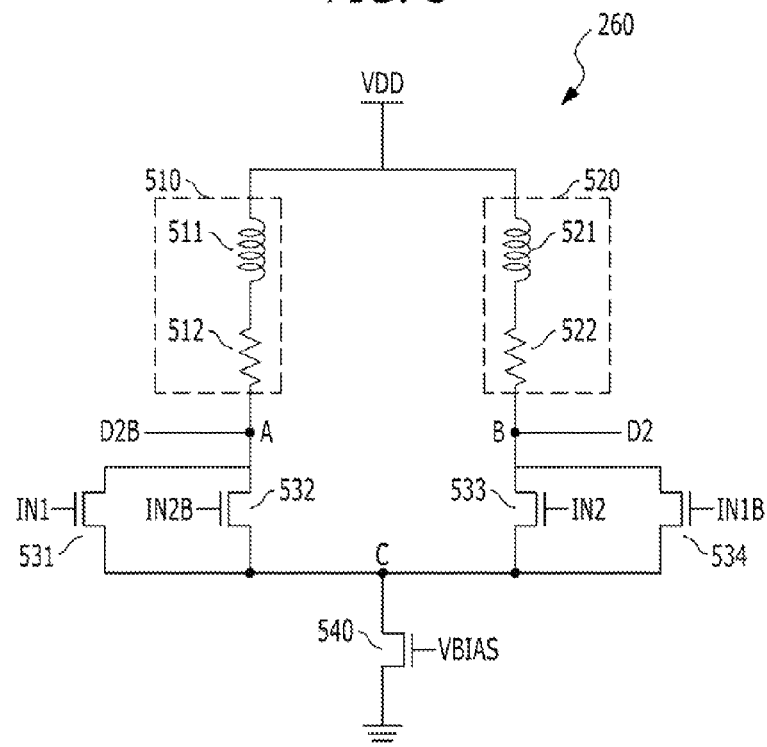
FIG. 5 is a configuration diagram of a restoring unit of FIG. 2.

FIG. 5 is a configuration diagram of the restoring unit 260 of FIG. 2.

Referring to FIG. 5, the restoring unit 260 may include a first load 510, a second load 520, a first pull-down driving section 531, a second pull-down driving section 532, a third pull-down driving section 533, a fourth pull-down driving section 534, and a common sinking section 540.

The first load 510 may be connected between a high voltage terminal VDD and a sub output terminal A from which the restored sub signal D2B is outputted. The first load 510 may include an inductor 511 and a resistor 512. The second load 520 may be connected between the high voltage terminal VDD and a main output terminal B from which the restored main signal D2 is outputted. The second load 520 may include an inductor 521 and a resistor 522.

The first pull-down driving section 531 may sink a current from the sub output terminal A to a common node C in response to the signal IN1. The second pull-down driving section 532 may sink a current from the sub output terminal A to the common node C in response to the signal IN2B. The third pull-down driving section 533 may sink a current from the main output terminal B to the common node C in response to the signal IN2. The fourth pull-down driving section 534 may sink a current from the main output terminal B to the common node C in response to the signal IN1B. The pull-down driving sections 531 and 534 may include NMOS transistors.

The common sinking section 540 may sink a predetermined amount of current from the common node C to a ground terminal. The common sinking section 540 may include an NMOS transistor configured to operate by receiving a bias voltage VBIAS.

The restoring unit 260 has a differential amplifier structure. Thus, the higher the levels of the signal IN1 and IN2B inputted to the first and second pull-down driving sections 531 and 532 are, the lower the level of the restored sub signal D2B is. Furthermore, the lower the levels of the signals IN1 and IN2B inputted to the first and second pull-down driving sections 531 and 532 are, the higher the level of the restored sub signal D2B is. That is, the restored sub signal D2B and the input signals IN1 and IN2B have a relation that D2B=−IN1−IN2B=−IN1−(−IN2)=−(IN1−IN2). Similarly, the main signal D2 and the input signals IN2 and IN1B have a relation that D2=−IN1B−IN2=−(−IN1)−IN2=IN1−IN2. As described above, IN1=D1+D2 and IN2=D1. Thus, when IN1 and IN2 are substituted with D1 and D2 in the above equations, it can be checked that the signals D2 and D2B transmitted by the second transmitting/receiving circuit 120 are restored through the restoring unit 260.

The operation of the restoring unit 260 may be simply summarized as follows. The restoring unit 260 may generate the signal D2 and D2B by subtracting the signal IN2 and IN2B from the signal IN1 and IN1B.

Figure 6:
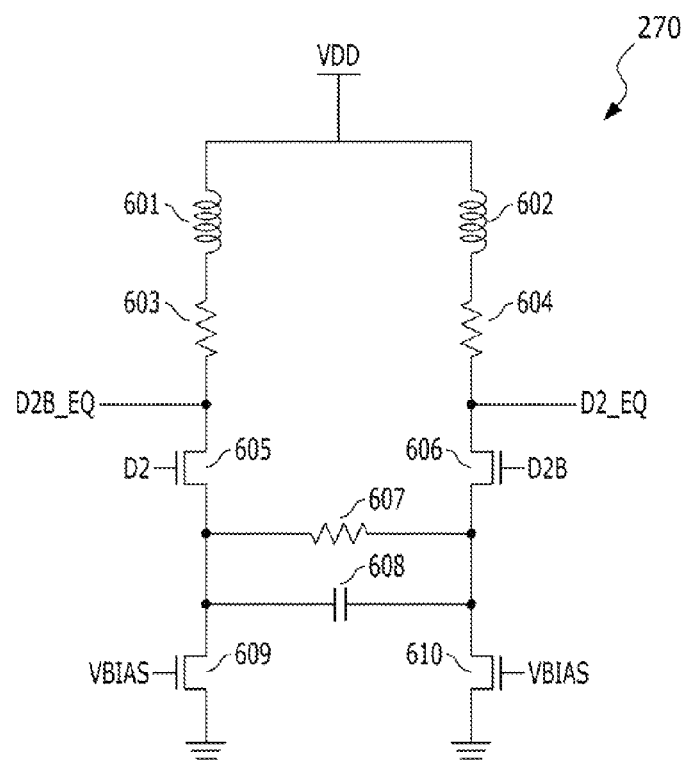
FIG. 6 is a configuration diagram of an equalizing unit of FIG. 2.

FIG. 6 is a configuration diagram of the equalizing unit 270 of FIG. 2.

Referring to FIG. 6, the equalizing unit 270 may include inductors 601 and 602, resistors 603, 604 and 607, a capacitor 608, and transistors 605, 606, 609 and 610. The equalizing unit 270 may be configured by adding the resistor 607 and the capacitor 608 to a differential amplifier. The values of the resistor 607 and the capacitor 608 of the equalizing unit 270 may be adjusted to amplify the gains of the input signals D2 and D2B at a specific frequency or more. Thus, signals D2_EQ and D2B_EQ may be generated to have a uniform gain in a wide frequency band.

Figure 7:
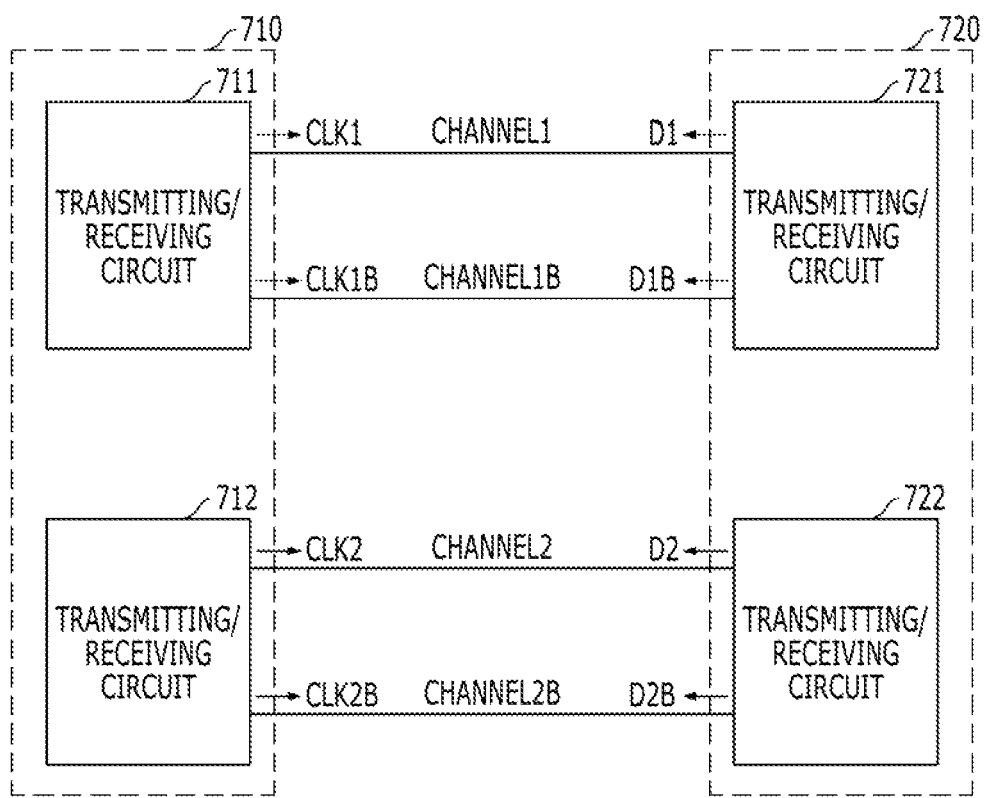
FIG. 7 is a configuration diagram of a transmitting/receiving system in accordance with an embodiment of the present invention

FIG. 7 is a configuration of a transmitting/receiving system in accordance with another embodiment of the present invention.

Referring to FIG. 7, the transmitting/receiving system may include two integrated circuit chips 710 and 720 and channels CHANNEL1 and CHANNEL1B and CHANNEL2 and CHANNEL2B.

The integrated circuit chips 710 and 720 may include two transmitting/receiving circuits 711 and 712 and two transmitting/receiving circuits 721 and 722, respectively. The transmitting/receiving circuit 711 of the integrated circuit chip 710 and the transmitting/receiving circuit 721 of the integrated circuit chip 720 may communicate through the channel CHANNEL1 and CHANNEL1B. The transmitting/receiving circuit 711 may transmit a first clock CLK1 and CLK1B to the transmitting/receiving circuit 721, and receive first data D1 and D1B from the transmitting/receiving circuit 721. The transmitting/receiving circuit 721 may receive the first clock CLK1 and CLK1B from the transmitting/receiving circuit 711 and transmit the first data D1 and D1B synchronized with the received first clock CLK1 and CLK1B to the first transmitting/receiving circuit 711.

The transmitting/receiving circuit 712 of the integrated circuit chip 710 and the transmitting/receiving circuit 722 of the integrated circuit chip 720 may communicate through the channel CHANNEL2 and CHANNEL2B. The transmitting/receiving circuit 712 may transmit a second dock CLK2 and CLK2 to the transmitting/receiving circuit 722, and receive second data D2 and D2B from the transmitting/receiving circuit 722. The transmitting/receiving circuit 722 may receive the second dock CLK2 and CLK2 from the transmitting/receiving circuit 712 and transmit the second data D2 and D2b synchronized with the received second clock CLK2 and CLK2B to the transmitting/receiving circuit 712. Each of the transmitting/receiving circuits 711, 712, 721 and 722 may be configured in substantially the same manner as illustrated in FIG. 2.

The first dock CLK1 and CLK1B and the second clock CLK2 and CLK2B may have different frequencies. For example, the first clock CLK1 and CLK1B may have a frequency of 500 Mhz, and the second clock CLK2 and CLK2B may have a frequency of 1 Ghz. In this case, the integrated circuit chip 710 and the integrated circuit chip 720 may exchange the clock CLK1 and CLK1B and the data D1 and D1B at a speed of 500 Mhz through the channel CHANNEL1 and CHANNEL1B, and may exchange the clock CLK2 and CLK2B and the data D2 and D2B at a speed of 1 Ghz through the channel CHANNEL2 and CHANNEL2B. That is, different clocks may be exchanged through the respective channels, and data may be exchanged at different speeds.

In the above-described embodiments, various signals such as data and clocks are transmitted as a differential method in which a signal includes a main signal without a suffix B and a sub signal with a suffix B. However, even when signals are transmitted as a single-ended method, the present invention may be applied.

In accordance with the embodiments of the present invention, signals may be simultaneously transmitted through the same channel in both ways.

Although various embodiments have been described for illustrative purposes, it will be apparent to those skilled in the art that various changes and modifications may be made without departing from the spirit and scope of the invention as defined in the following claims.

What is claimed is:

1. A transmitting/receiving circuit comprising:
a transmitter suitable for transmitting a transmission signal to a channel;
a receiver suitable for receiving a signal of the channel;
a replica channel configured by replicating the channel;
a replica transmitter suitable for transmitting the transmission signal to the replica channel;
a replica receiver suitable for receiving a signal of the replica channel; and
a restoring circuit suitable for synthesizing the signal of the channel, which is received by the receiver, and the signal of the replica channel, which is received by the replica receiver, and restoring a reception signal from the signal of the channel.

2. The transmitting/receiving circuit of claim 1, wherein the transmitter and the replica transmitter are configured in substantially the same manner, and the receiver and the replica receiver are configured in substantially the same manner.

3. The transmitting/receiving circuit of claim 1, wherein the restoring circuit restores the reception signal by subtracting the signal of the replica channel from the signal of the channel.

4. The transmitting/receiving circuit of claim 1, further comprising an equalizing circuit suitable for equalizing the reception signal restored by the restoring circuit.

5. The transmitting/receiving circuit of claim 1, wherein the transmission signal, the signal of the channel, the signal of the replica channel, and the reception signal are transmitted as a differential signaling.

6. The transmitting/receiving circuit of claim 5, wherein the restoring circuit generates a sub restored signal in response to a first main signal of the channel and a second sub signal of the replica channel, and generates a main restored signal in response to a second main signal of the replica channel and a first sub signal of the channel.

7. The transmitting/receiving circuit of claim 6, wherein the restoring circuit comprises:
a common node;
a first load between a high voltage terminal and a sub output terminal from which the sub restored signal is outputted;
a second load between the high voltage terminal and a main output terminal from which the main restored signal is outputted;
a first pull-down driving circuit suitable for sinking a current from the sub output terminal to the common node in response to the first main signal;
a second pull-down driving circuit suitable for sinking a current from the sub output terminal to the common node in response to the second sub signal;
a third pull-down driving circuit suitable for sinking a current from the main output terminal to the common node in response to the first sub signal;
a fourth pull-down driving circuit suitable for sinking a current from the main output terminal to the common node in response to the second main signal; and
a common sinking circuit suitable for sinking a current from the common node to a ground terminal.

8. The transmitting/receiving circuit of claim 1, wherein the replica channel comprises:
a resistor;
an inductor connected to one end of the resistor; and
a capacitor connected between the other end of the resistor and ground.

9. The transmitting/receiving circuit of claim 1, wherein the transmission signal and the reception signal are transmitted/received through the channel at substantially the same time.

10. A transmitting/receiving system comprising:
a channel;
a first transmitting/receiving circuit suitable for transmitting a first transmission signal through the channel; and
a second transmitting/receiving circuit suitable for transmitting a second transmission signal through the channel,
wherein the first and second transmitting/receiving circuits each comprises:
a replica channel configured by replicating the channel; and
a restoring circuit suitable for synthesizing a first signal transmitted through the replica channel and a second signal transmitted through the channel and restoring the first transmission signal or the second transmission signal from the second signal.

11. The transmitting/receiving system of claim 10, wherein the first transmitting/receiving circuit comprises:
a first transmitter suitable for transmitting the first transmission signal to the channel;
a first replica transmitter configured in substantially the same manner as the first transmitter and suitable for transmitting the first transmission signal to the replica channel;
a first receiver suitable for receiving the second signal; and
a first replica receiver configured in substantially the same manner as the first receiver and suitable for receiving the first signal.

12. The transmitting/receiving system of claim 11, wherein the restoring circuit restores the second transmission signal by subtracting the first signal received by the first replica receiver from the second signal received by the first receiver.

13. The transmitting/receiving system of claim 11, the second transmitting/receiving circuit comprises:
a second transmitter suitable for transmitting the second transmission signal to the channel;
a second replica transmitter configured in substantially the same manner as the second transmitter and suitable for transmitting the second transmission signal to the replica channel;
a second receiver suitable for receiving the second signal;
a second replica receiver configured in substantially the same manner as the second receiver and suitable for receiving the first signal.

14. The transmitting/receiving system of claim 13, wherein the restoring circuit restores the first transmission signal by subtracting the first signal received by the second replica receiver from the second signal received by the second receiver.

15. The transmitting/receiving system of claim 10, wherein the first transmitting/receiving circuit transmits the first transmission signal to the second transmitting/receiving circuit through the channel at substantially the same time as the second transmitting/receiving circuit transmits the second transmission signal to the first transmitting/receiving circuit through the channel.

16. The transmitting/receiving system of claim 10, wherein when the first transmission signal comprises a clock, the second transmitting/receiving circuit transmits the second transmission signal to the first transmitting/receiving circuit in synchronization with the clock.

17. A transmitting/receiving system comprising:
a first integrated circuit chip comprising one or more first transmitting/receiving circuits; and
a second integrated circuit chip comprising one or more second transmitting/receiving circuits,
wherein the first transmitting/receiving circuits communicate with the second transmitting/receiving circuits through respective channels, and
wherein the first transmitting/receiving circuit is suitable for transmitting a first clock through the channel and restoring first data by subtracting the first clock from a first signal transmitted through the channel, and the second transmitting/receiving circuit is suitable for transmitting the first data synchronized with the first clock through the channel and restoring the first clock by subtracting the first data from the first signal transmitted through the channel.

18. The transmitting/receiving system of claim 17, wherein the first transmitting/receiving circuits respectively transmit first clocks having different frequencies from each other.

19. The transmitting/receiving system of claim 17, wherein the first transmitting/receiving circuit comprises:
a first transmitter suitable for transmitting the first clock to the channel;
a first replica channel configured by replicating the channel;
a first replica transmitter suitable for transmitting the first clock to the first replica channel;
a first receiver suitable for receiving the first signal transmitted through the channel;
a first replica receiver suitable for receiving a second signal transmitted through the first replica channel; and
a first restoring circuit suitable for synthesizing the first signal received by the first receiver and the second signal received by the first replica receiver and restoring the first data, and the second transmitting/receiving circuit comprises:
a second transmitter suitable for transmitting the first data to the channel;
a second replica channel configured by replicating the channel;
a second replica transmitter suitable for transmitting the first data to the second replica channel;
a second receiver suitable for receiving the first signal transmitted through the channel;
a second replica receiver suitable for receiving a third signal transmitted through the second replica channel; and
a second restoring circuit suitable for synthesizing the first signal received by the second receiver and the third signal received by the second replica receiver and restoring the first clock.

20. The transmitting/receiving system of claim 19, wherein the first transmitter and the first replica transmitter are configured in substantially the same manner and the first receiver and the first replica receiver are configured in substantially the same manner, and
the second transmitter and the second replica transmitter are configured in substantially the same manner and the second receiver and the second replica receiver are configured in substantially the same manner.

* * * * *